July 13, 1937.  J. J. HJÄRTSÄTER  2,086,804
V-BELT AND GROOVED PULLEY FOR THE SAME
Filed Oct. 8, 1935
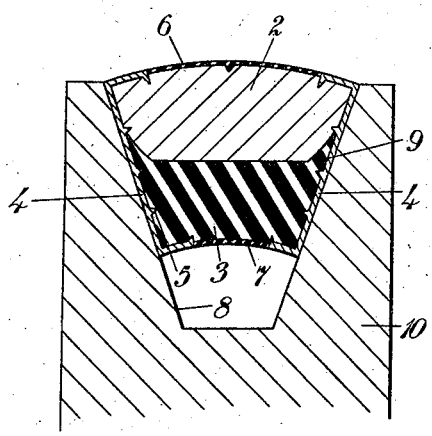
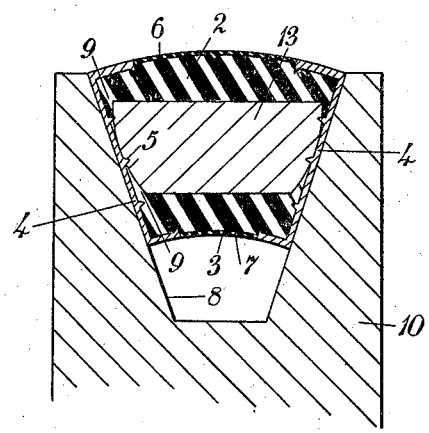
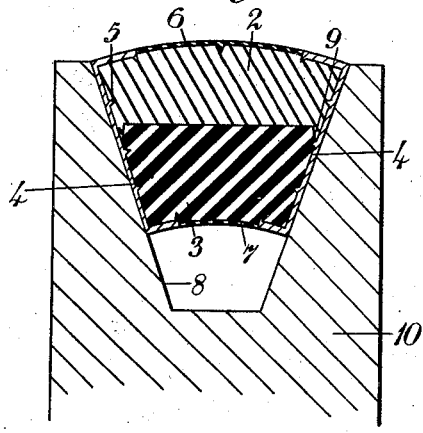
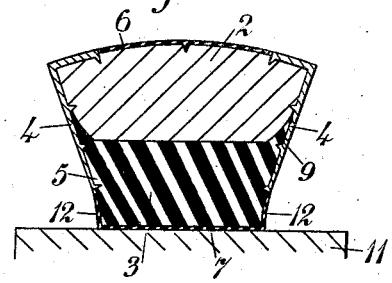

Patented July 13, 1937

2,086,804

UNITED STATES PATENT OFFICE 2,086,804

V BELT AND GROOVED PULLEY FOR THE SAME

Jacob Johansson Hjärtsäter, Nygard Railway Station, Norway

Application October 8, 1935, Serial No. 44,112
In Norway October 13, 1934

7 Claims. (Cl. 74—234)

In construction of V belts it has been difficult to find a belt fitting correctly in the grooves of the pulley and giving good friction on ordinary pulleys by so-called combined V and flat drive, by which the belt runs over a grooved pulley and an ordinary pulley without groove.

The ordinary constructions of V belts run well where the belt pulleys are of the same size, but for short centre distance and ratio for instance 1:7 or more, the ordinary V belts will not fit equally well in the small and in the large pulley, as the upper part of the V belt, when running over the small pulley, stretches and moves away from the groove, whilst the lower part of the belt is compressed and forms bulges in such a manner that the friction surfaces will be greatly reduced. Even if it has been tried to remedy these drawbacks, for instance by using concave side faces, making recesses in the lower part of the belt etc., the use of such constructions is very limited, and the number of horsepowers, which can be transmitted per belt is comparatively small. The economy of such power transmissions consequently is bad and the lifetime generally is short.

A rightly designed V belt must be made in such a manner, that by short centre distance and great ratio it will automatically adjust itself in the grooves simultaneously as the lower part of the belt gets a perfect contact with the great pulley when this is made as an ordinary pulley without grooves.

The relation between the strength of the belt and the friction in the grooves must also be quite utilized, so that each belt gives maximum of efficiency.

The present invention has for its object the production of V belts and grooved pulleys fulfilling these conditions, and commencing with a belt which in known manner is built up of a soft, elastic material, for instance rubber, and a harder, less elastic material for instance vulcanized canvas ribbons. The new and peculiar features of the invention consist in the special forming and placing in relation to each other of said parts in connection with special, elastic wearing and friction surfaces. To obtain maximum efficiency the grooved pulley is covered with or made of a material preventing slipping of the belt.

The invention is illustrated on the enclosed drawing, where:—

Figures 1, 2, 3 and 4 show diagrammatically some forms of execution of the V belt in cross section.

Referring to Figure 1, 2 denotes the harder part of the belt, which for instance may be built up of vulcanized cords or ribbons, and 3 denotes the softer part of the belt, made for instance of soft rubber. The harder part here forms the upper part of the belt and the softer part its lower part. The upper and lower side of the belt are parallelly curved, the upper side being convex and the lower side being concave, and said parts are covered respectively with a protective coat 6, 7 of rubber. On the sides the belt is coated with specially reinforced and prepared, elastic wearing and friction surfaces 4, being intimately connected to the belt for instance by projections or ribs 5, which fit into corresponding recesses in the belt material. By such a building up of the belt the harder part with convex upper surface will prevent an objectionable pressing down of the belt in the groove 8 in the pulley with great loads, whilst the softer part with concave lower side, when running over small pulleys, will give the belt opportunity to be compressed, so that locking of the lower part in the groove 8 is avoided. Hereby automatically correct adjustment of the friction surfaces 4 is obtained under all conditions. In order still further to assure the adjustment of the latter, the lower end of the harder part 2 is rounded at 9. The grooved pulley 10 is made of or eventually covered with a material which prevents slipping of the belt.

By the form of execution shown in Figure 2, the harder part 13 is placed in the neutral axis, whilst the upper part 2 and the lower part 3 of the belt are both made of soft rubber. When running over the pulleys the convex upper part 2 will stretch and cause increased pressure and friction in the groove 8. The harder part 13 and the lower part 3 here have the same effect as pointed out in the explanation of Figure 1.

By the form of execution shown in Figure 3, the harder part 3 is placed in the lower part of the belt, whilst its softer part is placed in the upper part with the same effect as pointed out under the explanation of Figure 2.

Figure 4 shows a cross section of a V belt according to Figure 1, used by so-called combined V and flat drive, by which one pulley 11 is an ordinary pulley without groove. In this manner of drive, where the small pulley is made as a grooved pulley and the great pulley as an ordinary pulley, it is the lower part 3 of the V belt, which effects friction with the pulley 11. In V belts according to Figure 1 or 2 the soft lower part 3 will be pressed out when the belt is loaded, simultaneously as the concave lower side is straightened and gives an increased friction surface. In this manner of drive the protection coat 7 may be somewhat strengthened, so that it resists the wearing against the pulley 11. In order to facilitate the form alteration the lower part of the wearing and friction surfaces are made thinner at 12.

In all forms of execution the softer part of the belt is so proportioned, that when loaded it gives a suitable pressure on the friction surface 4 or the lower side 7.

The invention can naturally be executed in other ways than stated above without departing from the scope of the invention, for instance the belt material itself may consist of a number of cores, which alternately are placed between a number of soft layers with a greater number of layers in the middle of the belt than in the periphery. Instead of the ordinarily used cord or canvas inlays, these may be substituted, reinforced or combined with for instance inlays of wire, ribbon, rope, etc., which may be produced of beryllium alloys or other materials with the object of increasing the strength of the belts. By great loads and high temperatures the grooved pulleys may be provided with suitable channels or cooling devices. A modification of the belts may consist in the use of sections corresponding to line or rope pulleys.

Having now described my invention, what I claim as new and desire to secure by Letters Patent is:—

1. An endless transmission belt of the side driving or V type, comprising a soft and a harder material, the cross-section of said belt having a convex upper surface and a concave lower surface, and the sides of said belt being covered with elastic wearing and friction surfaces.

2. An endless transmission belt of the side driving or V type, comprising a soft and a harder material, the harder material being placed in the upper part of the belt and the softer material in the lower part of the belt, the cross-section of said belt having a convex upper surface and a concave lower surface, and the sides of said belt being covered with elastic wearing and friction surfaces.

3. An endless transmission belt of the side driving or V type, comprising a soft and a harder material, the harder material being placed in the neutral axis of the belt with softer material on the upper side and on the lower side, the cross-section of said belt having a convex upper surface and a concave lower surface, and the sides of said belt being covered with elastic wearing and friction surfaces.

4. An endless transmission belt of the side driving or V type, comprising a soft and a harder material, the harder material being placed in the lower part of the belt and the softer material in the upper part of the belt, the cross-section of said belt having a convex lower surface and a concave upper surface, and the sides of said belt being covered with elastic wearing and friction surfaces.

5. An endless transmission belt of the side driving or V type, comprising a soft and a harder material, the cross-section of said belt having a convex upper surface and a concave lower surface, and the sides of said belt being covered with elastic wearing and friction surfaces, the upper and lower surface of the belt being covered with a coat which protects the belt against wearing action.

6. An endless transmission belt of the side driving or V type, comprising a soft and a harder material, the harder parts being reinforced with inlays of high quality material in order to increase the strength of the belt, the cross-section of said belt having a convex upper surface and a concave lower surface, and the sides of said belt being covered with elastic wearing and friction surfaces.

7. An endless transmission belt of the side driving or V type, comprising a soft and a harder material, the cross-section of said belt having a convex upper surface and a concave lower surface, and the sides of said belt being covered with elastic wearing and friction surfaces, the said wearing and friction surfaces being made thinner on the lower part in order to facilitate the form alteration when using the belt in the case where one pulley is an ordinary pulley without grooves.

JACOB JOHANSSON HJÄRTSÄTER.